United States Patent

[11] 3,612,137

[72] Inventor Raymond J. Guyot
Paris, France
[21] Appl. No. 777,119
[22] Filed Nov. 19, 1968
[45] Patented Oct. 12, 1971
[73] Assignee CTA-Compagnie Industrielle de Textiles Artificiels et Synthetiques
Paris, France
[32] Priority Nov. 27, 1967
[33] France
[31] 129,815

[54] LARGE SIZE TIRES FOR TRUCKS AND OTHER HEAVY VEHICLES
6 Claims, 3 Drawing Figs.
[52] U.S. Cl. ................................................. 152/362 R
[51] Int. Cl. .................................................. B60c 15/06
[50] Field of Search .......................................... 152/362, 362 CS, 374

[56] References Cited
UNITED STATES PATENTS

| | | | |
|---|---|---|---|
| 2,958,360 | 11/1960 | Macklem et al. | 152/362 X |
| 3,052,275 | 9/1962 | Hylbert, Jr. | 152/362 X |
| 3,232,331 | 2/1966 | Cappa et al. | 152/374 X |
| 3,392,773 | 7/1968 | Warren et al. | 152/362 X |
| 3,406,733 | 10/1968 | Boileau | 152/362 |

FOREIGN PATENTS

| | | | |
|---|---|---|---|
| 989,498 | 4/1965 | Great Britain | 152/362 |

OTHER REFERENCES

Vanderbilt Rubber Handbook, 1958, Published by R. T. Vanderbilt Co., 230 Park Ave., N.Y. Page 418 only relied upon

*Primary Examiner*—Arthur L. La Point
*Assistant Examiner*—George H. Libman
*Attorney*—Sherman and Shalloway ABSTRACT: A large size tire particularly adapted for trucks and other heavy vehicles, the tire being one that is reinforced by a radial or standard casing of cords turned in the bead in open plies around a single wire, the tire being one in which the turned-back portion of the cords follows a direction substantially parallel to that of the traction cords opposite thereto, the bead being stiffened above the wire to the level of the rim by a core of rubber having a shore hardness greater than 80, said core being covered with a further rubber core having a shore hardness in the order of 55 to 60.

Generally, the length of the turned-back portion of the cords forming the open ply is as slight as possible, the end of the turned-back cords being turned slightly outward.

PATENTED OCT 12 1971 3,612,137

INVENTOR
RAYMOND J. GUYOT

BY Sherman & Shalloway
ATTORNEYS

LARGE SIZE TIRES FOR TRUCKS AND OTHER HEAVY VEHICLES

The present invention is directed to an improvement in large size tires for trucks and other heavy vehicles, and more particularly to an improvement in such large size tires for trucks and other heavy vehicles wherein such tires are reinforced by a radial or crossed casing of cords, such cords being turned back in "open" plies around a single wire surmounted by a hard rubber core.

In the past years there have been many improvements made in the construction of tires. Thus, for example, improvements progressively made in the characteristics of the textile materials used in the manufacturing of tires have made it possible to reduce the thickness of the walls of the tires while attaining equal service characteristics. This improvement has itself been supplemented, for example, by the use of larger and larger cords for reinforcements, thereby making it possible to considerably reduce the number of plies necessary in the manufacture of the tires. Such improvements which have been developed in the past are both of considerable value for tires of standard structure (i.e., those having side layers making an angle between them) and for tires with a radial casing since they offer the manufacturers great possibilities in reducing the cost of tires by allowing the use of less raw materials in tire production. However, although such improvements previously developed are of considerable value in such standard tires as described, the same are not satisfactory with respect to truck tires and similar tires subjected to very heavy loads. In this regard, the use of truck tires having thin walls and a single wire shows anomalies in the zone of the bead resulting in a severe limitation of the life of the tire. Thus, since such tires with thin walls are very flexible in the zone of the beads, it is as though a shock wave were destroying the construction of the beads slightly above the level of the edge of the rim where the tire is subjected to heavy loads such as truck tires are subjected to. This effect is even more pronounced at the point at which the turned back plies end. This effect is particularly noticeable in the case of tires for heavy loads reinforced with synthetic textiles, i.e., polyamides, polyesters, etc., rayon with a high tensile strength, or cords of glass.

Generally, in tires with textile or glass reinforcement, the plies are turned around a wire, imprisoning a core of rubber located above the wire. Such plies come almost in contact with the traction layers by forming "closed" plies. When used, the destruction of tires used in this manner occurs generally in a zone close to the end of the turned layers in a manner which makes it often visible on the inside traction plies. While various attempts have been made to improve such generally employed structure, such attempts have for the most part been unsuccessful especially with respect to truck tires and tires employed for other high-load uses.

Thus, for example, various attempts have been made to increase the size and length of the core located above the wire about which the plies are turned, the folded layers of plies still being brought very close to the traction layers. While in some respects better results have been obtained as the filling cores located above the wire have been progressively increased, in the case of large radial tires with one or two plies on the side the results are insufficient for industrial use contemplated. Accordingly, with respect to truck tires and similar tires subject to heavy loads, any improvements resulting from the increase in the size and length of the core located above the wire have not been satisfactory for the purposes to which the tire is subjected.

Accordingly, it has long been the desire of the art of tire production to provide a structure for large size tires, e.g., truck tires and other tires subjected to heavy loads, which would eliminate the inherent deficiencies and disadvantages associated with previously employed structures.

This has now been accomplished in accordance with the present invention, whereby a tire can be produced having wearing characteristics and strength characteristics far in excess of those possessed by conventional tires. This is accomplished in accordance with the present invention by providing a tire for trucks and other heavy vehicles wherein such tire is reinforced by a radial or standard casing of cords turned in the bead, in open plies, around a single wire, so that the turned back portion of the cords follows a direction substantially parallel to that of the traction cords opposite thereto, the bead being stiffened above the wire to the level of the rim edge by a core of rubber with a shore hardness greater than 80. By such a structure a tire is produced which has an unexpectedly high wearing ability and unexpectedly high ability to withstand the stresses associated with heavy loads.

It is accordingly a principle object of the present invention to provide a novel large size tire for trucks and similar heavy vehicles, which tire eliminates the inherent deficiencies and disadvantages of prior art structures.

It is a further object of the present invention to provide a large size tire for trucks and similar heavy vehicles wherein such tire is reinforced by a radial or crossed casing of cords, the cords being turned back in "open" plies around a single wire surmounted by a hard rubber core.

It is still a further object of the present invention to provide a novel large size tire for trucks and other heavy vehicles, such tire being reinforced by radial or standard casing of cords turned in the bead, in open plies, around a single wire, so that the turned back portion of the cords follows a direction substantially parallel to that of the traction cords opposite thereto.

It is still a further object of the present invention to provide such tire wherein the bead is stiffened above the wire to the level of the rim edge by a core of hard rubber with a shore hardness greater than 80, and then, above this level a second rubber core with a shore hardness greater than 80, and a third rubber core with a shore hardness of about 55 to 60.

Still further objects of the present invention will become more apparent from the following more detailed description of the present invention in conjunction with the following drawings wherein.

Figure 1:
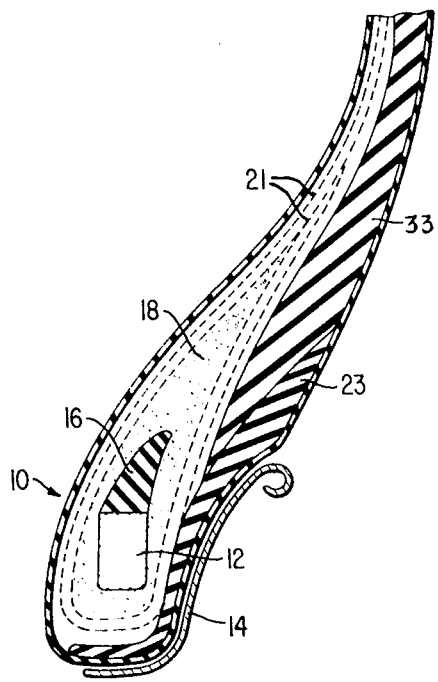
FIG. 1 is a cross-sectional view of a tire bead in accordance with the prior art.

The above advantages of the novel tire structure of the present invention are achieved through the provision of a tire bead structure wherein a radial or standard casing of cords employed as reinforcement are turned back in the bead in open plies around a single wire in such a manner that the turned back portion of the cords follows a direction substantially parallel to that of the traction cords opposite thereto. Such modification in the conventional construction of tire bead, particularly for trucks and other heavy vehicles has led to a substantial improvement in the quality of the bead, particularly as related to service life and ability to withstand heavy loads.

In accordance with the present invention, the radial or standard casing cords can comprise any of those conventionally employed in the reinforcement of beads for tires, truck tires and heavy load tires in particular. Such reinforcement cords can therefore comprise, for example, rayon, particularly rayon with a high tensile strength, synthetic textiles such as polyamides, e.g., nylon, and polyesters, e.g., dacron, as well as cords of glass. Accordingly, as employed throughout the instant specification and appended claims, the term "cords" is meant to embrace any and all of such conventional materials generally employed in the reinforcement of tires, particularly truck tires and tires employed for other heavy vehicles.

In accordance with the present invention, it is preferred that the length of the turned back layers or plies of cords should be as slight as possible. That is, the plies should be as short as possible while still maintaining the necessary reinforcement of the tire. In this connection, it has been discovered that tires with long turned back layers, checked during service, show a tendency for the cords to become detached and destroyed, particularly toward the ends of the turned back layers. If they are shortened in accordance with this preferred embodiment of the present invention, this phenomenon disappears as if the shock waves were localized at a certain distance from the rim. In accordance with the present invention, it has been surprisingly found that even if the turned back lengths of cords are much shorter than those generally employed, there is still sufficient anchoring of the traction layers in the zone of the wire to provide excellent reinforcement of the tire.

In accordance with still another preferred embodiment of the present invention the ends of the turned back layers of cords should not only be parallel to the traction layers opposite thereto, but in addition should be turned outward i.e., away the traction layers, in the amount of approximately 2 to 3 millimeters. Such an embodiment provides excellent reinforcement of the tire with still a lessened tendency for the cords to be destroyed or detached during service.

It has also been found advantageous in accordance with the present invention to place just above the wire a parallelepipedic core of hard rubber, generally one having a Shore hardness greater than 80 i.e., a Shore hardness in the order of 85. This core should preferably occupy the entire space between the traction layers and the turned back layers which are parallel to the traction layers and should have sufficient height to reach almost to the level of the edge of the rim of the wheel in which the tire is placed.

A second hard core i.e., one having a Shore hardness of greater than 80, generally a Shore hardness of about 85 is placed above the first core, such second hard core being cut on a bevel with a third core, i.e., one having a Shore hardness of about 55 to 60 covering this second hard core, the third hard core having the affect of keeping the turned back layers substantially parallel to the traction layers. The use of this third core having a Shore hardness within a range of 55 to 60 makes it possible to decrease the average hardness of the bead in the direction away from the wire. This, of course, is a further advantage of the novel tire structure of the present invention.

The rubbers employed in accordance with the present invention are generally those rubbers well known in the art. Thus, for example, conventional rubbers compounded to produce materials of the requisite shore hardness are well known in the art and any of the same can be conveniently employed in accordance with the present invention. Thus, for example, the rubber materials can comprise compounded, natural and synthetic rubbers including as representative examples polyisoprene, polybutadiene, copolymers of butadiene and styrene, copolymers of butadiene and acrylonitrile, copolymers of butadiene, styrene and acrylonitrile, polychloroprene, etc., A as indicated previously the methods of producing such rubbers and compounding the same to produce materials having the requisite Shore hardness in accordance with the present invention are well known in the art.

Additionally, in accordance with a still further embodiment of the present invention, the ends of the turned back layers of cores can be advantageously covered with a soft rubber, i.e., one having a Shore hardness within the order of 55 to 60. Covering the ends of the folded back layers of cores in this manner, avoids detachment of such ends from the surrounding rubber material.

The present invention will now be described by reference to the drawings wherein like numerals represent like elements in the various figures.

FIG. 1 illustrates a tire bead 10 as in accordance with the prior art. The casing of the tire represented in FIG. 1 is built up of two layers of cords 21 turned around a wire 12. The cords are reinforced in the bead zone by trimming fabrics, e.g., rubberized cotton fabrics 18 and the wire 12 is topped by a triangle of hard rubber 16, the greatest height of the hard rubber being about one and one half times the height of the wire 12.

The embodiment shown in FIG. 1 representing the prior art is one wherein the cords 21 turned around the wire 12 follow a direction which ends up in the formation of a "closed" ply with the turned back portion of the cords ending up adjacent the traction cords of the bead. It is also noted that in accordance with this embodiment representing the prior art, the turned back portion of the cords forming the closed ply, extends far above the rim 14 of the wheel.

Figure 2:
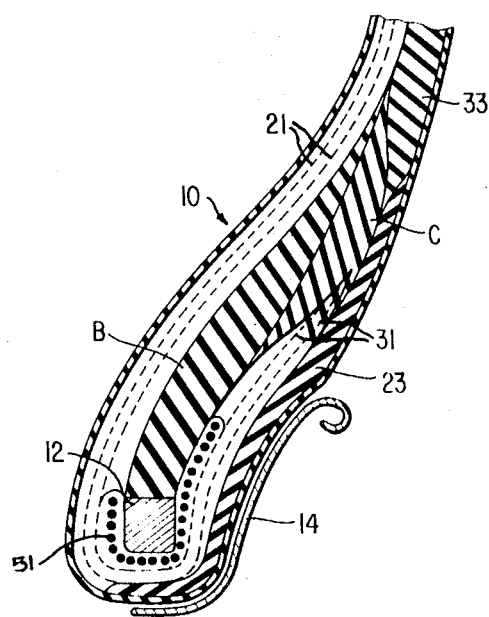
FIG. 2 is a cross-sectional view of the tire bead in accordance with one embodiment of the present invention.

FIG. 2 illustrates the bead of a radial tire casing. In accordance with this embodiment the cords 21 are turned around the wire 12 in "open" plies so that the direction of the turned back portion of the cords 31 is substantially parallel to the direction of the traction cords opposite thereto. In accordance with the present invention, by substantially parallel is meant that relationship, the traction cords and the turned back portion cords take substantially the same direction in the formation of "open" plies, it of course being obvious that some minor deviation from true parallelism can be tolerated in accordance with the present invention. It is only necessary that the cords turned around the wires do not form closed plies with the traction cords.

In this embodiment of the present invention, a fairly long triangular core of hard rubber B is located in the bead 10 atop the wire 12 with the ends of the turned back layers of cords going only a slight amount above the rim 14. These layers are embedded in a soft, rubber C to protect the same from breakage.

A similar embodiment is illustrated in FIG. 3 where again the cords 21 of the bead are turned around the wire 12 in such a manner that the direction of the turned back portion of the cords are substantially parallel to the direction of the traction cords opposite thereto.

A slightly different variation is shown in that the wire 12 is surmounted with a core of hard rubber A forming a parallelogram fairly close to the same width as the wire 12. This parallelogram A of the hard rubber is itself surmounted by a triangular core of hard rubber B as illustrated previously in connection with FIG. 2.

In accordance with this embodiment of the present invention the ends of the turned back cords 41 go slightly above the rim 14 and in addition are slightly turned outward, the ends of the turned back cords being embedded in a profile of soft rubber C.

Figure 3:
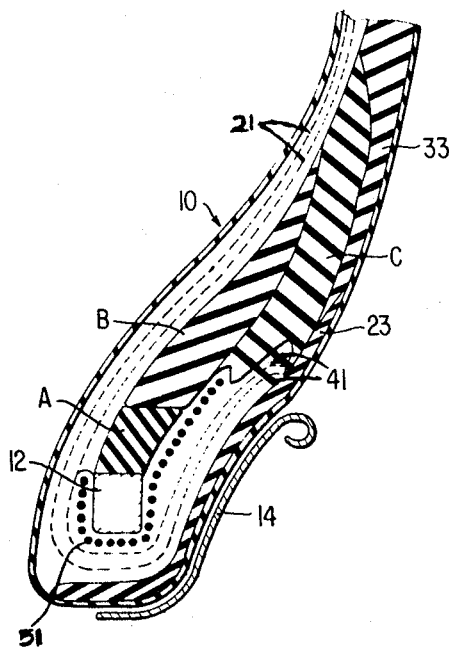
FIG. 3 is a cross-sectional view of a tire bead in accordance with a further embodiment of the present invention.

In all of the Figures the outer surface of the bead is made up of a soft rubber section 33 and a hard rubber section 23 as in a conventional tire. An optimal-strengthening fabric 51 is shown in FIGS. 2 and 3.

The present invention will now be described by reference to the following specific examples. It is to be understood that such examples are presented for purposes for illustration only and the present invention is in no way to be deemed as limited thereto.

EXAMPLE 1

A series of 8.25×20 tires with a radial casing was built so that the bead, after vulcanizing, had the shape of FIG. 1. The casing of these tires was built up of two layers of nylon cords (840/3 ×3 den. (with locking of 640 cords per meter), reinforced in the bead zone by two trimming fabrics of rubberized cotton cut on a bias. The wire of these tires was surmounted, as customary, by a triangle of hard rubber, the greatest height of which was about one and a half times the height of the wire. The hard rubber was one having a Shore hardness of 85.

This series of tires was put through rolling tests on a smooth drum, at 50 km./hour, with loads increasing by progressive degrees until a maximum of 175 percent of the initial load (which was 1,500 kg. for an inflation pressure of 5 kg.) The increase of the load was such that the load of 175 percent was reached after 7,200 kms. None of the tires of this series exceeded 7,200 kms.; the destruction of these tires was characterized by a rupture and a detachment of the layers in the bead zone and especially on the inside plies.

EXAMPLE 2

A series of tires 8.25×20 with a radial casing was built so that the bead, after vulcanizing, had the shape of FIG. 2. The layers were turned back into "open" plies around the wire, so that the direction of the turned back portion was parallel to the direction of the traction layers located opposite. The casing of these tires was made up in the same way as in the preceding example, but, in contrast with the beads of example 1, the wires of this series of tires were surmounted by a long triangular core of hard rubber (80 Shore hardness) of 8 cm.; the ends of the turns of the layers went only 2.5 cm. above the support of the rim and these ends are buried in soft rubber (60 Shore hardness).

These tires were put through the same rolling tests as in example 1. This series of tires went an average of 12,300 km. with 6,100 km. with a 75 percent overload. This is a considerable and unexpected improvement over the conventional tires of example 1.

EXAMPLE 3

A series of 8.25×20 tires with a radial casing was built so that the bead, after vulcanizing, has the shape of FIG. 3. The casing of these tires was made as in the preceding examples and the cores were turned back in "open" plies around the wires. The wires of these tires were surmounted by a core of hard rubber (85 Shore hardness) forming a parallelogram fairly close to the same width as the wire, this parallelogram being surmounted by a triangular core of hard rubber 4 (85 Shore hardness). The total height of the said rubber profile was 6 to 7 cm.

The ends of the layers went slightly above the support of the rim and were in addition slightly turned outward. These ends were buried in a profile of soft rubber (60 Shore hardness). The end of the profile of soft rubber went above the point of the hard rubber.

This series was made to undergo the same rolling test as in example 1. This series of tires went an average of 15,000 km. with 7,800 km. with a 75 percent overload. Again a substantial unexpected improvement over the conventional tires of example 1 is shown.

EXAMPLE 4

Three series of 8.25×20 tires with a radial casing were built so that the bead, after vulcanizing, had respectively:
1. the configuration of FIG. 1,
2. the configuration of FIG. 2,
3. the configuration of FIG. 3 for the three respective series.

The casing of the tires of these three series are made up of 2 layers of glass cords of (600/5) ×3 den. (with locking of 700 cords per meter).

The twists of the cords in each layer were alternately ZS and SZ so that the layers are not deformed if they are accidentally released before calendering.

The layers of the casing are turned back around the wires:

The series produced in accordance with FIG. 1 and example 1 had "closed" plies; the series formed in accordance with FIG. 2 and example 2 had "open" plies; and the series formed in accordance with FIG. 3 and example 3 had "open" plies whose ends were turned slightly outward.

Except from the nature of the cords, the beads of the tires of each of these three series have exactly the configuration as shown respectively in FIGS. 1, 2 and 3.

These tires were made to undergo the same rolling tests as in example 1.

The tires of the first series did not hold up more than 7,200 km.

The tires of the second series held up to 17,600 km. (with 10,400 km. with a 75 percent overload).

The tires of the third series held up to 24,600 km. (with 17,400 km. with a 75 percent overload).

These examples shown that by modifying the structure of the bead of large size tires that are reinforced by casings of cords of rayon or synthetic textiles or glass cords, it is possible to considerably increase the machine rolling life of these tires even when they are greatly overloaded.

What is claimed is:

1. In a tire bead of a tire particularly adapted for trucks and other heavy vehicles, characterized by a casing of cords turned back around a single wire, the improvement which comprises a structure wherein said cords are turned back is said bead in open plies, around a single wire, the turned back portion of said cords following a direction substantially parallel to the traction cords opposite thereto, said bead being stiffened above said wire by a first parallelepipedic core of rubber of a Shore hardness of greater than 80, and then, above said first one, by a second bevelled core of rubber of a Shore hardness of greater than 80, with a third rubber core of a Shore hardness of about 55–60 adjacent said second core.

2. The tire of Claim 1 wherein said cords are turned back around said wire only to the extent of a level slightly above the level at which the bead is adjacent the rim of a tire wheel when the tire is in position thereon.

3. The tire of claim 1 wherein the ends of the turned back portion of cords are turned slightly away from the traction cords opposite thereto.

4. The tire of claim 1 wherein the ends of the turned back portion of cords are covered by a rubber core of a Shore hardness of 55 to 60.

5. The tire of claim 1 having a sidewall, said sidewall having a Shore hardness less than that of the third rubber core.

6. The tire of claim 1 wherein the parallelepipedic core and the bevelled core are integrally formed of rubber having a Shore hardness greater than 80.